United States Patent [19]
Taylor et al.

[11] Patent Number: 4,508,487
[45] Date of Patent: * Apr. 2, 1985

[54] AUTOMATIC LOAD SEEKING CONTROL FOR A PUMPJACK MOTOR

[75] Inventors: Noel R. Taylor; Paul A. Taylor, both of Odessa, Tex.

[73] Assignee: CMD Enterprises, Inc., Tex.

[*] Notice: The portion of the term of this patent subsequent to Sep. 2, 1997 has been disclaimed.

[21] Appl. No.: 545,758

[22] Filed: Oct. 26, 1983

Related U.S. Application Data

[63] Continuation of Ser. No. 156,740, Jun. 5, 1980, Pat. No. 4,446,415, which is a continuation of Ser. No. 27,798, Apr. 6, 1979, Pat. No. 4,200,440, which is a continuation-in-part of Ser. No. 854,389, Nov. 23, 1977, abandoned.

[51] Int. Cl.³ .................. F04B 49/06; F04B 35/04
[52] U.S. Cl. ........................................ 417/12; 417/45
[58] Field of Search ................. 417/12, 45, 53; 318/798

[56] References Cited

U.S. PATENT DOCUMENTS

| | | | |
|---|---|---|---|
| 1,778,976 | 10/1930 | Hunter . | |
| 2,377,726 | 6/1945 | Stapleton | 172/289 |
| 2,575,716 | 11/1951 | Kilgore | 318/224 |
| 2,709,775 | 5/1955 | Del Carlo | 318/771 |
| 2,763,825 | 9/1956 | Gibson | 318/226 |
| 2,794,161 | 5/1957 | Schaefer | 318/221 |
| 2,850,690 | 9/1958 | Rawcliffe | 318/224 |
| 3,005,411 | 10/1961 | Metz . | |
| 3,332,007 | 7/1967 | Livengood | 323/9 |
| 3,332,621 | 7/1967 | Tanner | 236/46 |
| 3,378,755 | 4/1968 | Sawyer | 318/226 |
| 3,440,512 | 4/1969 | Hubby | 318/474 |
| 3,509,824 | 5/1970 | Schmidly, Jr. | 417/12 |
| 3,526,816 | 9/1970 | Pacce et al. | 318/225 |
| 3,624,471 | 11/1971 | Japp et al. | 318/771 |
| 3,721,866 | 3/1973 | McIntosh | 317/141 R |
| 3,916,257 | 10/1975 | Harper | 317/13 C |
| 3,940,668 | 2/1976 | Voldemarovich | 318/226 |
| 3,953,777 | 4/1976 | McKee | 417/45 |
| 4,035,701 | 7/1977 | Jensen | 318/226 |
| 4,041,360 | 8/1977 | Morris | 318/221 R |
| 4,042,966 | 8/1977 | Newell | 361/27 |
| 4,058,757 | 11/1977 | Welton | 318/474 |
| 4,220,440 | 11/1983 | Taylor et al. | 417/12 |

FOREIGN PATENT DOCUMENTS

| | | | |
|---|---|---|---|
| 800207 | 8/1958 | United Kingdom | 318/226 |
| 293105 | 10/1968 | United Kingdom . | |

*Primary Examiner*—William L. Freeh
*Attorney, Agent, or Firm*—Carwell & Helmreich

[57] ABSTRACT

Method and apparatus for matching the power output of a high slip motor to the demand requirement of a pumpjack unit. The stators of the high slip motor are automatically connected in various different configurations to provide the optimum torque as required by the pumpjack unit due to the downhole pumping conditions. A novel control circuitry is connected between the motor starter and the motor stators. The control measures the power drawn by the stators and selects the most optimum configuration thereof for the load required by the pumpjack. This selection operates the motor in the lowest possible torque mode, which is considered the best electrical and mechanical operation of the pumpjack apparatus.

9 Claims, 7 Drawing Figures

AUTOMATIC LOAD SEEKING CONTROL FOR A PUMPJACK MOTOR

This is a continuation of application Ser. No. 156,740, now U.S. Pat. No. 4,446,415 filed June 5, 1980, which, in turn, is a continuation of Ser. No. 027,798, filed Apr. 6, 1979, now U.S. Pat. No. 4,200,440, which, in turn, is a continuation-in-part of Ser. No. 854,389, filed on Nov. 23, 1977, now abandoned.

BACKGROUND OF THE INVENTION

In the production of hydrocarbon from wellbores, it is common to employ a pumpjack unit for actuating a string of sucker rods which reciprocates a bottomhole pump. Each cycle of the pumpjack unit imposes varying loads on the pump and rodstring and accordingly, the load on the motor continually varies in a cyclic manner each reciprocation of the pumpjack as shown in FIG. 6 of the drawings.

FIG. 6 shows one complete reciprocation of a rod string of a pumpjack unit, referred to herein as an upstroke and a downstroke of the pumpjack unit. As evidenced in the above pumpstroke cycle, the motor load varies from 10% up to 200% of the motor rated current under some conditions of operation. Hence, the oilwell pumpjack load is unique. The starting torque required for actuating the massive weights of the rod string and fluid column or counter balance weights is considerable, and as the pumpjack strokes, the load changes generally in the manner shown in FIG. 6. Hence, each cycle of operation or stroke, has a rod peak, a weight peak, and two off-peaks. The frequency of the cycle, or stroke, depends on the strokes per minute that the pump is reciprocating, and is, generally, in the range of 4–10 seconds in duration. If the well is stroked ten strokes per minute by the pumpjack unit, a complete cycle would occur each six seconds. And during that time, the current through the motor can vary from 10-20% of the rated motor current for off-peak readings and to as much as 180%–200% of the rated motor current for either or both of the rod and weight peak currents.

For this reason, the high slip and, later, the ultra high slip motor was developed and constructed so that the motor could slip, or drag down, such that it varies in speed as a result of changing torque demands during each cycle of the pumpjack apparatus. Hereafter, these motors shall be referred to as "oilwell pumping motors".

Most oilwell pumping motors utilized in conjunction with pumpjack units are 440 volts, three phase A.C. and range from ten to one hundred twenty-five horsepower. These specifically designed oilwell pumping motors have the three field coils or stators thereof each comprised of dual windings so that nine leads exit from the motor, thereby enabling the windings to be connected in Y, $\Delta$Y, or $\Delta$ configuration, respectively; thus providing a selection of low, medium, and high running torques, respectively.

Upon initial installation of the oilwell pumping motor, a selection of the electrical connection of the nine electrical leads leading to the various windings must be mechanically effected at that time, and should it subsequently be desired to change the winding connections from $\Delta$ to $\Delta$Y, for example, thereby reducing the available torque or power, it is necessary for the electrician to visit the well site, break the old connections, and make the necessary changes. Should these changes from $\Delta$ to $\Delta$Y subsequently prove to be more than adequate for lifting the production fluid, the motor will run under unnecessarily high torque conditions. There still remains the unused and more desirable low torque Y connection, which is the most desirable mode of operation when the pumpjack load conditions permit this configuration.

Accordingly, anytime the motor torque mis-matches the requirements of the pumpjack unit, it is necessary to recognize the undesirable condition and to instruct an electrician to mechanically effect the required changes in the motor winding, or otherwise the motor will not be operating in its most efficient torque mode and, in an extreme example, the motor would overheat and shut down if overloaded.

Accordingly, it would be desirable to have made available a means by which the field windings of an oilwell pumping motor is automatically connected to provide the torque best suited for the particular hydrostatic head and load associated with the particular wellbore which it is producing. An automatic load seeking control which provides this selection is the subject of the present invention.

SUMMARY OF THE INVENTION

This invention relates to oil production apparatus and specifically to a pumpjack unit having an oilwell pumping motor and means by which the motor windings are automatically connected in Y, $\Delta$Y, and $\Delta$ configuration in response to the average load imposed thereon by the pumpjack unit over a time interval during which the pumpjack completes several strokes.

This change in motor characteristics occasioned by the changing demands of the pumpjack is obtained by a first contact means of the present invention which initially electrically connects the stator in Y configuration, which is the lowest torque mode possible of the three different possible configurations. A first sensor means measures the current flow through the windings of the stators and disconnects the first contact means upon the current flow through the stators exceeding a first set or maximum average value during a multiplicity of pump strokes. A second contact means immediately connects the stators in a $\Delta$Y configuration upon said first contact means being disconnected in response to the sensor means.

Circuit means including a first timer disconnects the second contact means and reconnects the first contact means to again establish the Y configuration after a predetermined time interval has elapsed.

A third circuit means, including a third contact means and a second current sensor means, measures the current flow through the $\Delta$Y connected stators and disconnects the second contact means while connecting the stators in $\Delta$ configuration upon the current flow through the $\Delta$Y stators exceeding a second set value which is greater than said first set value during another multiplicity of pump strokes.

The circuit means of the present invention includes a second timer means which disconnects the third contact means and again connects the stators in the previous $\Delta$Y configuration after a preselected time interval has expired.

Accordingly, the field windings or stators of the motor are connected in the most desirable configuration for the specific pumpjack loads, and the pumpjack unit can therefore produce the well under the most optimum conditions of operation. Should the hydrostatic head of the well decrease, thereby increasing the load on the pumpjack unit, the motor current will increase, thereby causing the controller to select the next most desirable operational configuration but one that keeps the motor operating efficiently rather than overheating and shutting down as would have otherwise occurred had the motor remained in the Y configuration. Where the motor is connected in the Y configuration, the controller changes to the $\Delta$Y configuration. The $\Delta$Y connected stators produce the well with the motor running at greater torque and power output. This condition is maintained for a preset period of time whereupon the motor is thereafter returned to its optimum mode of operation which is the Y connected stators, assuming that the load is not further increased. The motor again operates in this configuration until the load again increases whereupon the motor is again connected in the $\Delta$Y configuration.

After the motor has initially changed to the $\Delta$Y, or the second mode of operation, should the power requirement of the pumping load still be greater than the optimum power output of the $\Delta$Y connection, the second current sensor means determines this overload condition for this particular configuration of the windings, and again the controller changes the connection of the stator to the $\Delta$ configuration. This provides a high torque motor characteristic wherein the maximum power is delivered by the motor. The motor continues to operate in this mode for a preset time interval, whereupon the windings are thereafter returned to the $\Delta$Y configuration for another preset time interval, and thereafter returned to the original Y configuration as conditions change respective to pumping load requirements.

Accordingly, the controller responds to the current load increases and decreases over a period of time by changing from one mode of operation to another in a manner which provides the most optimum motor characteristics, thereby producing the well in the most efficient manner respective to the choice of variations available. This unusual operation of an oil well pumping, or high slip motor improves the power factor of the distribution system, increases the production efficiency, and imposes the softest loads throughout the entire pumpjack system.

Accordingly, a primary object of this invention is the provision of both method and apparatus for controlling the torque mode selection of an oil well pumping motor with respect to the downhole requirements.

Another object of the invention is to provide circuitry by which the stator windings of an oil well pumping motor is automatically changed between Y, Y$\Delta$, and $\Delta$ in accordance with the operational load demands of the pumpjack unit.

A further object of this invention is the provision of circuitry by which the stator windings of an oil well pumping motor are arranged respective to one another and to the source of the power to provide the most optimum pumping characteristics.

A still further object of this invention is the provision of apparatus for producing a wellbore which includes an oil well pumping motor connected to a pumpjack unit, with the motor characteristics being automatically changed through the use of thermally actuated switches and timing devices in response to the power requirements thereof.

Another and still further object of this invention is the provision of a method of operating a pumpjack unit with an oil well pumping motor which includes connecting the stators in various different manners to provide the optimum power output with respect to the pumping requirements.

A still further object of this invention is the provision of a method by which the internal wiring of an oil well pumping motor is selectively changed to automatically provide the most optimum power output thereof in response to varying pumpjack load requirements.

The method of the objects discussed above is carried out by measuring the current flow through selected parts of the motor during a multiplicity of strokes of the pumpjack and initiating a change in the motor connections when the current flow reaches a predetermined magnitude to thereby connect the motor in the most efficient mode of operation.

The above objects are attained in accordance with the present invention by the provision of a method which can be carried out with apparatus fabricated in a manner substantially as described in the above abstract and summary.

These and various other objects and advantages of the invention will become readily apparent to those skilled in the art upon reading the following detailed description and claims and by referring to the accompanying drawings.

DETAILED DESCRIPTION OF THE PREFERRED EMBODIMENTS

Throughout the various figures of the drawings, wherever it is practical or logical to do so, like or similar numerals will refer to like or similar objects.

Figure 1:
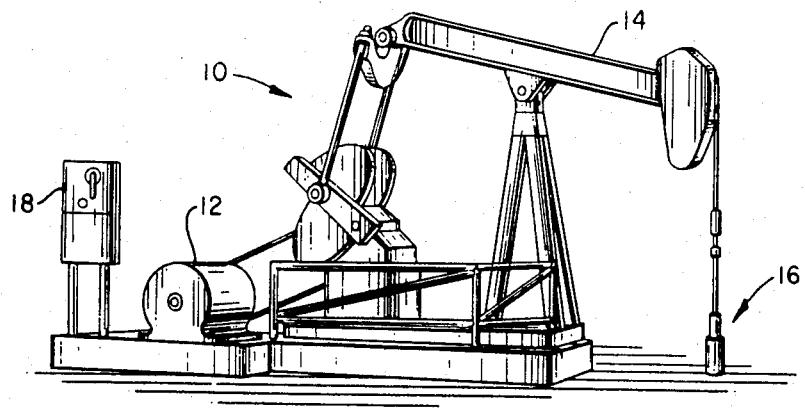
FIG. 1 is a perspective view of a pumpjack unit wherein apparatus made in accordance with the present invention is disclosed in combination therewith.

As seen in FIG. 1, the present invention includes a pumpjack unit 10 of usual construction and which can therefore take on many different forms. An oil well pumping motor 12, the details of which will be more fully explained later on, drives the illustrated gear box, which in turn rocks the walking beam 14 so that a string of sucker rods reciprocates a downhole pump (not shown) located downhole in a borehole 16. Controller 18 provides a controlled source of current to the motor and furthermore connects the stators of the motor in an optimum configuration respective to the power requirements at 14 and 16, as will be better appreciated as this disclosure is more fully digested.

Figure 2:
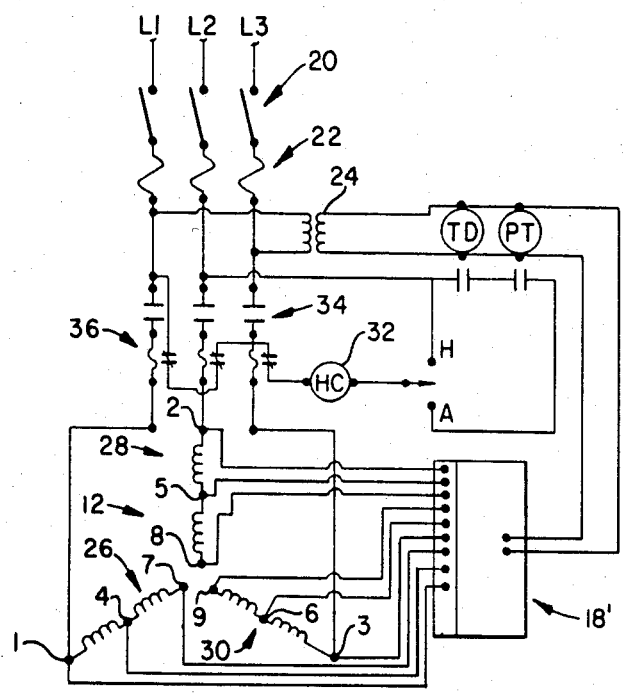
FIG. 2 is a schematical representation of a circuitry which forms part of the apparatus disclosed in FIG. 1.

As best seen in FIG. 2, a source of three-phase current is available at disconnect 20, and fusetrons 22 protect the remainder of the apparatus from short circuit. Transformer 24 reduces the 440 volt, three-phase power source to 115 volts AC, single-phase power for operation of the starter circuitry and pilot circuitry.

Numerals 26, 28, and 30 each indicate one of three field coils or stators of motor 12. Each of the stators includes dual windings from which the indicated three leads emerge, with each of the leads being numbered, and with the numbers being the consecutive numerals 1–9. The nine leads are brought from the motor over to a terminal block located in the control box 18'.

Holding coil 32 is actuated in response to the program timer PT being closed, and after the time delay TD has assumed the closed position. Energization of the holding coil closes the three contacts 34 located in each leg of the three-phase power. Overloads 36 are series connected with the holding coil in the usual manner. The holding coil is connected to terminal "A" for automatic operation.

Figure 3:
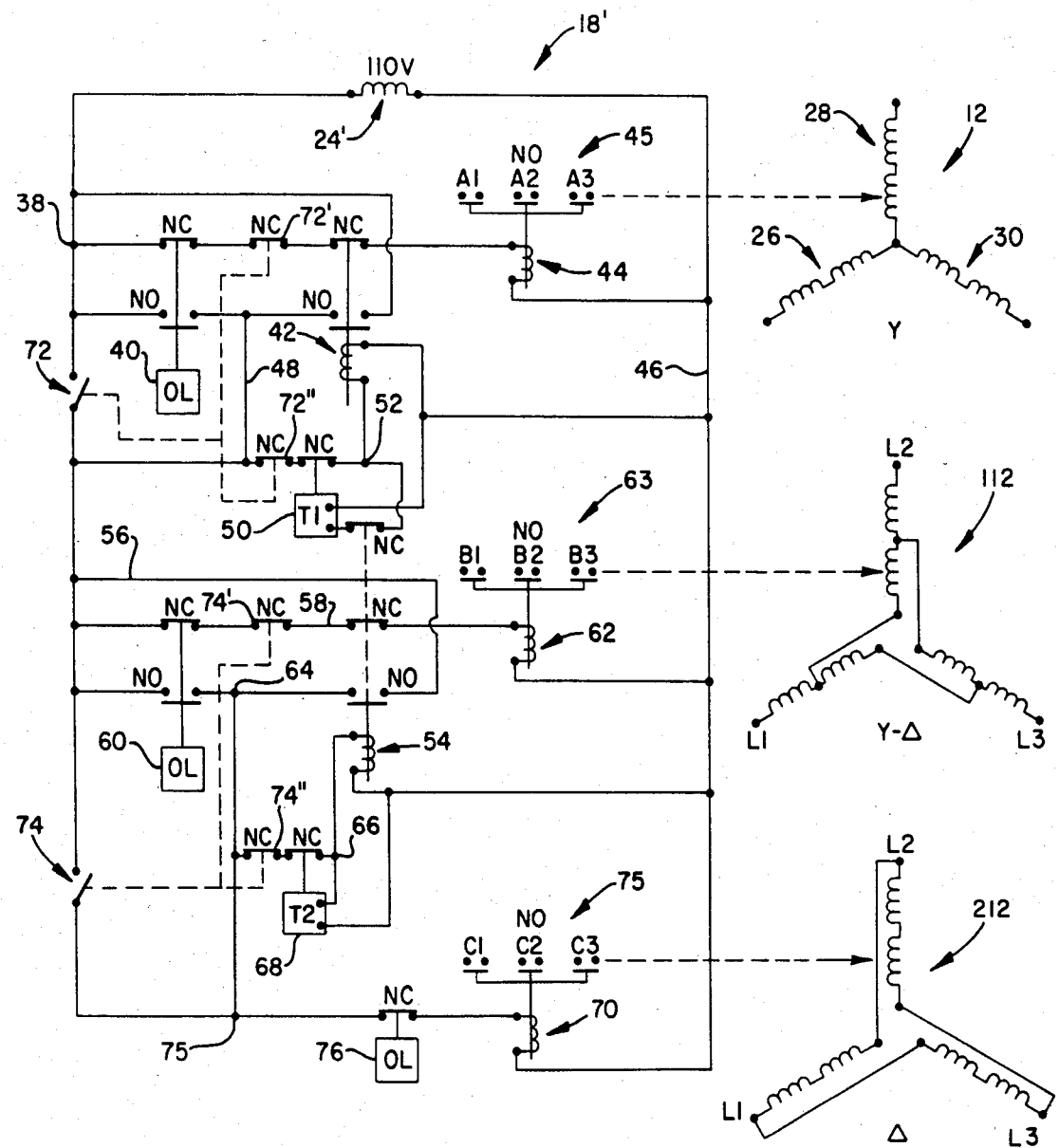
FIG. 3 is a schematical representation of a specific circuit which forms part of the apparatus disclosed in FIGS. 1 and 2.

In FIG. 3, the details of the circuitry 18' is more specifically disclosed. As seen in FIG. 3, supply leg 38 provides current to the normally closed contacts of a first overload sensor and switching device 40.

Sensor 40 measures current flow through the motor for a plurality of strokes and actuates the two switch contacts connected thereto in response to the power consumption of the motor exceeding a predetermined magnitude during the time interval required for said plurality of strokes.

Figure 7:
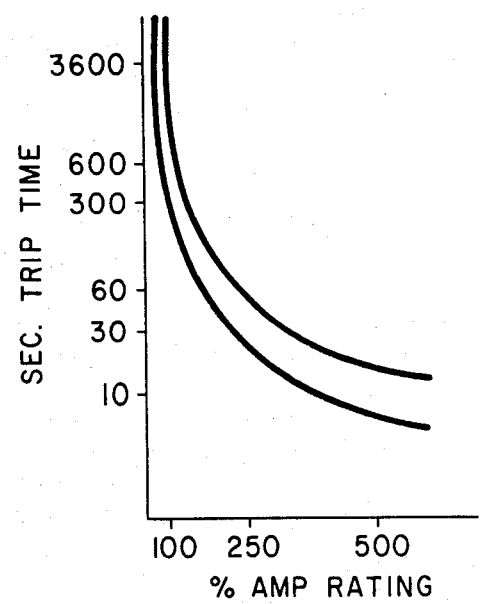
FIG. 7 is a plot showing the variation of time to trip versus overload of a thermal overload device.

One example of sensor device 40 is a bimetallic overload relay available from Westinghouse (T.M.), identified as Thermal Overload 3-pole Type AA Catalog No. 30 AA 13PB (page 91, Cat 25-000). This unit is a part of assembly No. A200-MICAC, as shown in the before mentioned catalog. This commercially available sensor and switching device has heater elements sized appropriately for the motor 12. As seen in FIG. 7, the response rate of the sensor and switching means 40 varies from several seconds for extreme overload conditions to several minutes for less severe conditions of overload.

Solenoid actuated contactor 42 is provided with the illustrated normally closed and normally opened switches, with the normally closed switch contact providing a source of current to the solenoid actuated first contact or Mode A contact of switch assembly 44. Conductor 46 forms the return leg back to the 110 volt transformer 24'.

A secondary supply leg 48 provides current to the normally closed contacts of a first timer 50. The timer is set to open the illustrated, normally closed contacts at a timer interval between the limits of one-half to ten hours. The timer is available from Eagle Timer 0 to ten hours, Catalog #BR 112A6, for example.

The first timer and the solenoid hold-in 42 are connected in parallel across junction 52 and return leg 46, with the uppermost of two normally closed contacts of a second hold-in solenoid actuated switch assembly 54 completing the circuit.

Conductor 56 is connected to the normally open contact of the second hole-in solenoid actuated switch assembly, while conductor 58 is connected to supply current from the secondary supply leg, across the normally closed contacts of a second overload sensor 60, and to the mode B or second solenoid actuated switch assembly 62, which effects the Y to ΔY configuration of the windings of the motor stator. Overload sensor 60 is similar in construction to sensor device 40, and is set to trip at a higher thermal current value respective to device 40. Junction 64 is connected to the normally open switch contacts of the second hold-in solenoid and second or Mode B switch contacts, and provides current at junction 66 by means of the normally closed contacts of a second timer 68.

The third or mode C solenoid actuated switch contact assembly 70 is connected to junction 64 and to the return leg 46. Omit switches 72, 72' and 72" are simultaneously actuated manually. Switches 74, 74', and 74" are similarly actuated. The omit switch clusters 72 and 74, respectively, omit the first and second mode circuitry, respectively.

Figure 4:
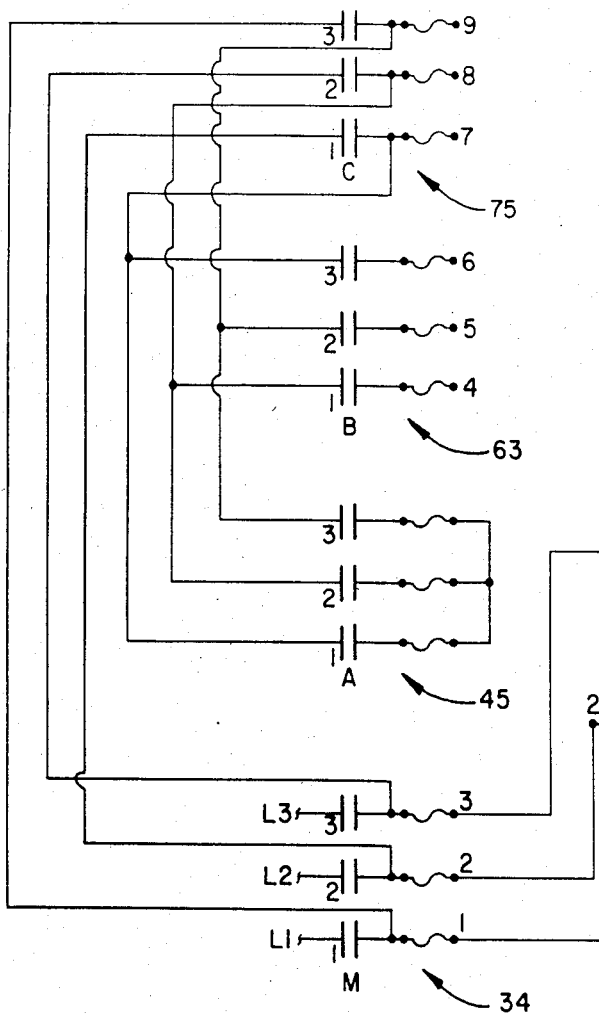
FIG. 4 is a schematical representation of circuitry which forms part of the present invention.

Still observing the embodiment of FIG. 3, it will be noted that switch contacts A1, A2, and A3 are related to FIGS. 2 and 4 in that the stators 26, 28, and 30 are connected into the Y configuration, which is the low torque or mode A operation, when the solenoid 44 is energized, thereby moving the normally opened contacts A1 to A3 into the closed or alternate position, thereby establishing the Y connections generally illustrated by the numeral 12 in FIG. 3.

The second solenoid 62 moves the normally open contacts B1, B2, and B3 into the alternate or closed position, thereby establishing the Y to ΔY configuration generally indicated by the arrow at numeral 112.

The third solenoid 70 moves the normally open contacts C1, C2, and C3 into the alternate or closed position, thereby establishing the Δ connection, as indicated by the arrow at numeral 212. Only one switch assembly 44, 62, or 70 can be closed at one time.

In FIGS. 2 and 4, contacts 34 constitute the main contact assembly which provides current to terminals 1, 2, and 3 of the stator windings. Numeral 45 indicates the contact assembly A1, A2, and A3; numeral 63 indicates the contact assembly B1, B2, and B3; while numeral 75 indicates the contact assembly C1, C2, and C3.

Figure 5:
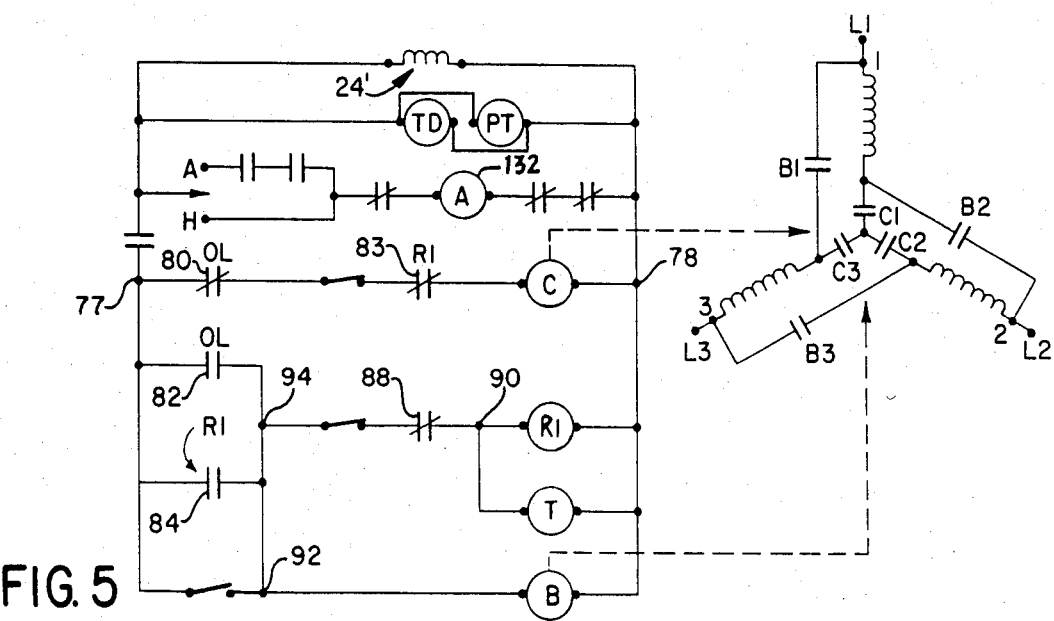
FIG. 5 is a schematical representation of circuitry which forms another embodiment of the present invention.

In the embodiment of FIG. 5, the holding coil 132 is series connected to the illustrated N.C. overloads and to a selector switch which is set on "A" terminal for automatic start. Junctions 77 and 78 are the supply and return legs for the entire circuitry which feed from transformer 24'.

Overload sensor switches 80 and 82 are simultaneously actuated in response to excess current flowing through the windings of the indicated motor stators. N.C. switch 83 and N.O. switch 84 are simultaneously actuated to the alternate position when solenoid R1 is energized.

N.C. switch 88 is opened by timer T connected across junctions 90 and 78 and is parallel with respect to solenoid R1. An omit switch is connected across junctions 77 and 92, while the second contactor switch solenoid B is connected across junctions 92 and 78, and actuates contacts B1, B2, and B3 to the closed position to attain a Δ connected stator assembly. Solenoid C actuates contacts C1, C2, and C3 to the closed position to attain a Δ connected stator assembly.

OPERATION

In operation, assume that the pumpjack unit of FIG. 1 is dormant and that the main disconnect 20 of FIG. 2 is in the open position. Closure of the main contacts provides a source of current to the transformer 24 and to the open contacts 34. After a time delay of a few seconds, TD closes its associate contact, and if the well has been dormant for some time, the programmer PT will have already closed its associate contact. At the same time, current is provided to circuitry 18', the details of which are more fully disclosed in FIGS. 3 and 4.

Connection of 32 into position A energizes holding coil 32, which closes contacts 34 to provide a source of current at terminals 1, 2, and 3 of oil well pumping motor 12. At the same time, circuitry 18' connects stators 26, 28, and 30 into the low torque, high slip or Y configuration according to the following novel sequence of events:

Transformer 24 of FIG. 2 provides secondary 24' of FIG. 3 with 110 volts at junction 38 so that current flows through the series connected, normally closed switches affixed thereto, through solenoid 44, and to the return leg 46, thereby moving the normally open contacts A1, A2, and A3 to the closed position. As seen in FIGS. 2 and 4, closure of contacts A1, A2, and A3 connects the remaining ends of the stators 7, 8, and 9 together to thereby provide the low torque, high slip configuration, which is the most ideal mechanical and electrical configuration for the most efficient operation of a pumpjack unit. The pumpjack continues to reciprocate the downhole pump until the programmer PT of FIG. 2 times out, whereupon the well remains dormant until the timer again actuates the circuitry, to cause the before described events again to occur. This is the mode A operation.

On the other hand, while the pumpjack is operating with the motor connected in mode A, should excessive power be required in actuating the downhole pump, overload sensor 40 will be actuated, thereby moving the normally open switch to the closed position, and at the same time opening the indicated normally closed switch contacts thereof. This action de-energizes solenoid 44, thereby breaking the connections at A1, A2, and A3, and at the same time, establishing current flow along conductor 48, across the normally closed contacts of timer 50 to junction 52, solenoid 42, and to the return leg 46. This action opens the normally closed and closes the normally open switch contacts associated with the first solenoid holding coil, thereby establishing current flow through the normally opened contacts thereof so that when the overload sensor 40 returns to its illustrated standby configuration, a source of current will be made available at junction 52 and across the normally closed contacts of timer 50, solenoid 42, timer 50, and the upper, normally closed contacts being provided with a source of current. This action provides solenoid 62 with a source of current from conductor 48 through means of the normally closed contacts of conductor 58 and back to the return leg. The pumpjack unit is now in the second mode of operation, since closure of switches B1, B2, and B3 places the stators in the Y-Δ configuration, as indicated by the numeral 112 in FIG. 3. The pumpjack unit continues to operate in this mode until one of the following two events occurs:

After a predetermined time, based on the production history of the well, which generally is a preset time of one-half to ten hours, T1 will time out, thereby opening normally closed contacts of timer 50, which disrupts current flow through the normally closed contacts (now closed) of solenoid 42, which again closes the normally open contacts A1, A2, and A3 of solenoid 44 and returns the motor to the original Y configuration seen at 12. The operation now must commence de novo as in the before described manner.

On the other hand, assuming that the Y-Δ connection 112 is insufficient for carrying the load imposed upon the pumpjack unit by the downhole pump, the second overload sensor 60 will sense this undesirable condition and move the normally closed and normally opened contacts thereof to the alternate position, whereupon current flow through solenoid 62 is discontinued, thereby breaking contacts B1, B2, and B3, and eliminating the Y-Δ configuration, while at the same time, current flow through the normally open contacts of 60 (now closed) to junction 64 provides solenoid 70 with current, thereby moving the normally open contacts C1, C2 and C3 to the closed configuration, whereupon the Δ connection 212 established. At the same time, current is made available to timer 68 by means of current flow through the illustrated, two, series connected, normally closed contacts to junction 66, solenoid 54, and back to the return leg.

Energization of solenoid 54 reverses the relationship of the three associate contacts, thereby interrupting and resetting timer 50, and providing a holding circuit along conductor 56, the normally opened contacts of 54, junction 64, through the normally closed contact of 68, junction 66, solenoid 54, and to the return leg 46.

The pumpjack unit operates in the Δ configuration, which is also the third mode, and provides the highest torque output. The operation continues in this high-torque mode until the second timer, which is preset according to the production characteristics of the well, times out, thereby de-energizing solenoid 54. This action interrupts current flow to the holding circuit and returns the switches associated with solenoid 70 to the open position, while at the same time establishing current flow to the solenoid 62, thereby closing normally open switches B1, B2, and B3 and again establishing the Y-Δ configuration, which is the second mode of operation. The unit now operates in the YΔ configuration until timer T1 times out; or, alternatively, until an excessive load is again experienced by overload sensor 60.

While in the YΔ mode of operation, the circuitry can therefore either return to the Y configuration after a predetermined lapsed time interval, or alternatively, go back into the high-torque mode should the YΔ configuration be incapable of supplying sufficient torque for actuation of the pumpjack apparatus.

Accordingly, the present invention provides a control for a pumpjack unit having an oil well pumping motor, the stator of which is connectable in either Y, ΔY, or Δ configuration, depending upon the varying load requirements while the pumpjack unit is producing the well.

This heretofore unknown desirable operation is accomplished by a first circuit means which connects the motor stator in a Y configuration until a first sensor means determines that excessive current is being drawn by the Y connected stators, whereupon the circuitry is changed to a higher torque-producing ΔY configuration, because the current requirements of the Y configuration exceeded a first maximum thermal current value.

The pumpjack unit continues in the ΔY configuration for a finite length of time, whereupon it is returned to the Y configuration unless excessive current is drawn while in the ΔY configuration, whereupon the circuitry again effects changes in the motor field connections to change the stators into the high torque Δ configuration.

The pumpjack unit continues to operate in the Δ configuration for a finite time interval, whereupon it is returned to the ΔY configuration, and thereafter to either the Y or the Δ configuration, depending upon the time interval involved and the thermal current drawn by the motor during this second mode of operation.

It is contemplated to extend this teaching into the operation of a high slip motor having a single winding for each stator of each current phase, and thereby being incorporated into a six-lead motor, 1-6, as seen illustrated in the embodiment of FIG. 5.

The six-lead motor of FIG. 5 is alternately connected between Δ and Y in accordance with the load requirements and a preselected time interval as follows:

The motor is first connected in the Y configuration by the closure of contacts C1, C2, and C3 upon solenoid C being energized. The motor operates in this configuration so long as the current requirements thereof are below a predetermined maximum average value during a multiplicity of pump strokes. When the Y configuration draws excessive current, contacts C1, C2, and C3 are opened by the action of solenoid C being de-energized, while contacts B1, B2 and B3 are closed by solenoid B being energized, thereby placing the motor in the Δ configuration. The motor operates in this configuration until the timer T times out, whereupon it returns to the Y configuration.

More specifically, in FIG. 5 solenoid 132 closes the main contactors 34 (FIG. 2), thereby energizing solenoid C and closing switch contacts C1, C2, and C3 in the before mentioned manner of solenoid 44. This action connects the stators into the Y configuration and the motor runs in this low-torque high slip mode until the overload sensor opens the normally closed OL and closes the normally open OL.

This action de-energizes solenoid C and energizes soleniod B by current which flows from 76, through contacts 82, through the normally closed contacts 88, and to the parallel connected solenoid R1 and timer T.

Solenoid R1 closes switch 84, thereby providing a holding circuit from 76, 84, 94, 88, 90, and through the parallel connected R1 and T, and back to return leg 78.

The circuitry remains in this configuration with the stators being connected in Δ until timer T times out which opens switch 88 and discontinues current flow to R1, thereby discontinuing current flow through solenoid B and moving contacts B1-B3 to the open position. Because the overloads have reset, current will now be available from 77, 80, 83, solenoid C, and to return leg 78, thereby closing the appropriate contacts to return the stators to the Y configuration.

It is sometimes desirable that the stator be initially electrically connected in the Δ configuration so that the highest torque is made available for starting the pumpjack unit. By the addition of a timer identical to the T1 and T2 (Example: BR 112A6 120 V Eagle Timer) and an additional relay such as R1 (Potter & Brumfield KRP11AG 120 V as example), the automatic load seeking controller apparatus can be selectively started in either the low or high torque mode, that is, Δ or Y mode. In some problem wells that have an unduly long downtime period, an unbalanced condition is caused by the accumulation of a high fluid column, and additional starting torque may be required to overcome this unbalanced condition. After the motor is started and run for a short period of time, for example, ten to twelve minutes, the timer times out, releasing the relay, which automatically connects the circuitry in the low torque mode, whereupon the automatic load seeking circuitry then continues to seek its most effective load range, as more fully discussed above.

The term "current flow sensor" as applied to element 40 and 60 of the drawings comprehends any current measuring device which effectively measures the power consumption, or the average current flow, through the motor for a time interval equal to several pumping cycles, and actuates the switch contacts of the circuitry in response to the power consumption exceeding a predetermined magnitude during this time interval. The preferred apparatus used herein for achieving this measurement is a bimetallic thermal overload relay which measures current flow through at least one of the motor windings, and is actuated to an alternate position upon a predetermined magnitude of current flowing therethrough for a predetermined interval of time. Such a device is commercially available and is uniquely adaptable to the present circuitry to achieve this function. The operating characteristics of one such thermal relay is seen in FIG. 7 of the drawings, which is a plot of the characteristic band curve for a type A overload relay with F series replaceable heater (Westinghouse).

For example, at 110% load, or 10% overload, the relay can be set to trip out in ten to twenty minutes, whereas at 150% load, or 50% overload, the relay trips out in one to two minutes. Hence, the response rate of shifting from one to another mode of operation is proportional to the severity of overload.

Figure 6:
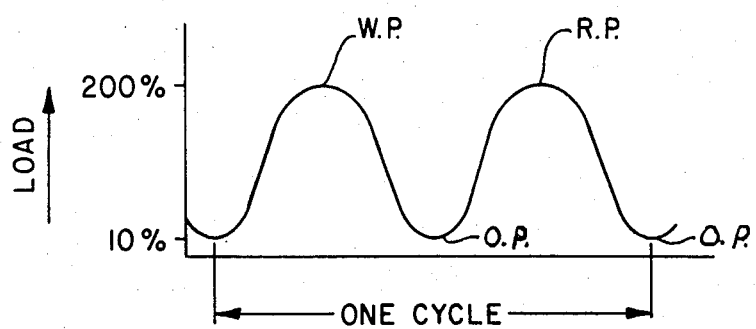
FIG. 6 is a plot showing the variation of pumpjack loads versus time.

Most pumpjack units generally make six to fifteen strokes per minute; and therefore, four to ten seconds is usually required for one complete cycle of operation (see FIG. 6).

During this cyclic operation, if the motor is shifted from the low torque Y to the intermediate torque ΔY configuration by instantaneously measuring the current and shifting in response to increased current flow, it stands to reason that such an operation would be impractical; because during each cycle, Applicants' controller would shift from Y, ΔY, Δ, and then shift back from Δ, ΔY, Y, which would, of course, be impractical. For this reason, Applicants' control measures the average thermal current flow through the windings of the stator over an extended period of time which is greater than the time interval of one cycle of operation. This action precludes shifting from one mode of operation to another unless the true average load, or the pumping characteristics of the well, has changed, thereby demanding a different winding configuration for a prolonged interval of time.

We claim:

1. A motor control unit for automatically controlling the torque output of a high slip motor powering a pump jack unit for stroking a downhole pump, said motor including motor starter means connected to motor stater windings and circuit means for altering the electrical configuration of said stater windings, said motor control unit comprising:

sensor means for detecting the magnitude of the average current flow through said starter windings during a multiplicity of pump strokes;

said stater windings being electrically connected in a first electrical configuration for a relatively lower motor torque output;

first overload means responsive to said sensor means for automatically altering the electrical configuration of said motor windings from said first electrical configuration to a second electric configuration when said average current flow exceeds a first preselected value to increase said motor torque output;

first timing means for sensing the time period said stater windings are connected in said second electrical configuration and automatically altering said motor stater windings from said second electrical configuration to another electrical configuration to reduce said motor torque output after a preselected period of time.

2. A motor control as defined in claim 1, wherein said first electrical configuration is a Y configuration, said second electrical configuration is a Δ configuration, and said another configuration is said Y configuration of a ΔY configuration.

3. A motor control as defined in claim 1, wherein said first electrical configuration is a Y configuration, said second electrical configuration is a ΔY configuration, and said another electrical configuration is said Y configuration.

4. A motor control as defined in claim 1, said first overload means further comprising:
   delay means for shortening the response rate for altering said first electrical configuration as a function of the magnitude of the difference between said first preselected value and said average current flow.

5. A motor control as defined in claim 4, wherein said delay means is a thermally actuated switch responsive to heat generated by current through said starter windings.

6. A motor control as defined in claim 1, further comprising:
   second overload means responsive to said sensor means for automatically altering said electrical configuration of said motor stater windings from said second configuration to a third configuration when said average current exceeds a second preselected value greater than said first preselected value to further increase said motor torque output;
   second timing means for sensing the time period said stater windings are connected in said third electrical configuration and automatically altering said motor stater windings from said third electrical configuration to said first or second electrical configuration to reduce said motor torque output after a preselected period of time.

7. A motor control as defined in claim 6, further comprising:
   third overload means for terminating current to said motor when said average current flow exceeds a third preselected value greater than said second preselected value.

8. A motor control as defined in claim 6, wherein each of said first and second timing means returns said motor stater windings to a lower torque configuration only after maintaining an electrical configuration during a time period exceeding the multiplicity of pump strokes.

9. A motor control as defined in claim 6, wherein said first electrical configuration is a Y configuration, said second electrical configuration is a ΔY configuration, and said third electrical configuration is a ΔY configuration.

* * * * *

UNITED STATES PATENT AND TRADEMARK OFFICE
CERTIFICATE OF CORRECTION

PATENT NO. : 4,508,487
DATED : April 2, 1985
INVENTOR(S) : Noel R. Taylor and Paul A. Taylor It is certified that error appears in the above-identified patent and that said Letters Patent are hereby corrected as shown below:

On the title page:

Assignee: Change "CMD Enterprises, Inc., Tex." to
--Noel R. Taylor and Paul A. Taylor--.

Related U.S. Application Data: Change "Pat. No. 4,200,440" to --Pat. No. 4,220,440--.

Column 1, line 8, change "4,200,440" to --4,220,440--.

Claim 1, column 10, lines 47-48, 49, 54, 65, and 67, change "stater" to --stator--.

Claim 1, column 10, line 52, change "starter" to --stator--.

Claim 5, column 11, line 22, change "starter" to --stator--.

Claim 6, column 11, line 28, change "stater" to --stator--.

UNITED STATES PATENT AND TRADEMARK OFFICE
CERTIFICATE OF CORRECTION

PATENT NO. : 4,508,487
DATED : April 2, 1985
INVENTOR(S) : Noel R. Taylor and Paul A. Taylor It is certified that error appears in the above-identified patent and that said Letters Patent are hereby corrected as shown below:

Claim 6, column 12, lines 5 and 7, change "stater" to --stator--.

Claim 8, column 12, line 20, change "stater" to --stator--.

Claim 9, column 12, line 27, change "$\Delta Y$" to --$\Delta$--.

Signed and Sealed this

Eighth Day of October 1985

[SEAL]

Attest:

DONALD J. QUIGG

*Attesting Officer*

*Commissioner of Patents and Trademarks—Designate*